US009665373B2

(12) United States Patent
Lemay et al.

(10) Patent No.: US 9,665,373 B2
(45) Date of Patent: May 30, 2017

(54) PROTECTING CONFIDENTIAL DATA WITH TRANSACTIONAL PROCESSING IN EXECUTE-ONLY MEMORY

(71) Applicant: Intel Corporation, Santa Clara, CA (US)

(72) Inventors: Michael Lemay, Hillsboro, OR (US); David M. Durham, Beaverton, OR (US); Barry E. Huntley, Hillsboro, OR (US); Vedvyas Shanbhogue, Austin, TX (US); Ravi L. Sahita, Beaverton, OR (US); Ravi Rajwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 14/752,079

(22) Filed: Jun. 26, 2015

(65) Prior Publication Data
US 2016/0378490 A1 Dec. 29, 2016

(51) Int. Cl.
*G06F 11/30* (2006.01)
*G06F 9/38* (2006.01)
*G06F 11/07* (2006.01)

(52) U.S. Cl.
CPC ........ *G06F 9/3802* (2013.01); *G06F 11/0745* (2013.01); *G06F 11/0751* (2013.01)

(58) Field of Classification Search
CPC . G06F 9/3802; G06F 11/0745; G06F 11/0751
USPC ....................................................... 713/189
See application file for complete search history.

(56) References Cited

U.S. PATENT DOCUMENTS 8,364,932 B2 1/2013 Ali et al.
2007/0028074 A1* 2/2007 Khosravi ............ G06F 12/1009
711/206
2009/0070526 A1 3/2009 Tetrick et al.
(Continued)

FOREIGN PATENT DOCUMENTS

WO 2011011769 A1 1/2011
WO 2014209269 A1 12/2014

OTHER PUBLICATIONS

LeMay, et al., "Cumulative Attestation Kernels for Embedded Systems," IEEE Transactions on Smart Grid, vol. 3, No. 2, pp. 744-760, Jun. 2012.
(Continued)

*Primary Examiner* — Mohammad W Reza
(74) *Attorney, Agent, or Firm* — Grossman, Tucker, Perreault & Pfleger, PLLC

(57) ABSTRACT

Generally, this disclosure provides systems, devices, methods and computer readable media for protecting confidential data with transactional processing in execute-only memory. The system may include a memory module configured to store an execute-only code page. The system may also include a transaction processor configured to enforce a transaction region associated with at least a portion of the code page. The system may further include a processor configured to execute a load instruction fetched from the code page, the load instruction configured to load at least a portion of the confidential data from an immediate operand of the load instruction if a transaction mode of the transaction region is enabled.

28 Claims, 8 Drawing Sheets

(56) References Cited

U.S. PATENT DOCUMENTS

| | | | |
|---|---|---|---|
| 2011/0029820 A1* | 2/2011 | Sehr | G06F 21/53 |
| | | | 714/38.1 |
| 2011/0087822 A1 | 4/2011 | Bennett et al. | |
| 2011/0107008 A1 | 5/2011 | Ben-Yehuda et al. | |
| 2012/0191948 A1 | 7/2012 | Day et al. | |
| 2014/0189881 A1* | 7/2014 | Lindsay | G06F 21/60 |
| | | | 726/27 |
| 2014/0281531 A1 | 9/2014 | Phegade et al. | |
| 2014/0380009 A1 | 12/2014 | Lemay et al. | |
| 2016/0117229 A1* | 4/2016 | Epstein | G06F 12/1416 |
| | | | 714/6.23 |

OTHER PUBLICATIONS

Guan, et al., "Protecting Private Keys against Memory Disclosure Attacks using Hardware Transaction Memory," 2015 IEEE Symposium on Security and Privacy, May 2015, pp. 3-19.

El Defrawy, et al., "SMART: Secure and Minimal Architecture for (Establishing a Dynamic) Root of Trust," NDSS, vol. 12, 2012, 15 pages.

International Search Report received for PCT/US2013/047381 mailed on Mar. 25, 2014, 2 pages.

Specification and Figures, U.S. Appl. No. 14/750,982, filed Jun. 25, 2015, 46 pages.

Specification and Figures, U.S. Appl. No. 14/670,988, filed Mar. 27, 2015, 56 pages.

Specification and Figures, U.S. Appl. No. 14/317,571, filed Jun. 24, 2014, 64 pages.

* cited by examiner

PROTECTING CONFIDENTIAL DATA WITH TRANSACTIONAL PROCESSING IN EXECUTE-ONLY MEMORY

FIELD

The present disclosure relates to protecting confidential data, and more particularly, to embedding confidential data in execute-only code pages further secured by transactional processing.

BACKGROUND

There are often situations where a relatively small quantity of confidential or secret data may be more valuable than larger quantities of data (e.g., bulk data) included in a program, system software or database. Examples of such "small secrets" may include cryptographic keys, passwords and the like. Some existing methods for protecting confidential data rely on context switching (e.g., managing and switching paging structures). Such methods, however, are generally burdensome and impose a relatively high computational overhead which can reduce the potential efficiencies that may otherwise be achieved through cryptographic extensions to an instruction set architecture (ISA).

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for protecting confidential data with transactional processing in execute-only memory. The confidential data, herein referred to as the "secret," may be relatively small, in terms of number of bytes, such as, for example, a cryptographic key or password, as opposed to an entire database or portion thereof. Embodiments of the present disclosure provide security for this secret by restricting access to the secret to a relatively small segment of trusted code, as opposed to allowing access by an entire software application or operating system. The trusted code may employ a load-immediate instruction configured to hold the secret within an immediate operand of the instruction, which can then be loaded into a register upon execution. The load-immediate instruction may further be configured to act as a no-operation (NOP) or fault generating instruction when executed outside of a transactional execution mode (also referred to more simply as a "transactional mode"). The load-immediate instruction may be contained in an execute-only memory page, thus preventing a potential adversary from reading (or modifying) the secret. Additionally, the transactional mode may be configured to clear any registers or memory locations that could reveal any information about the secret in the event of a transaction abort.

Figure 1:
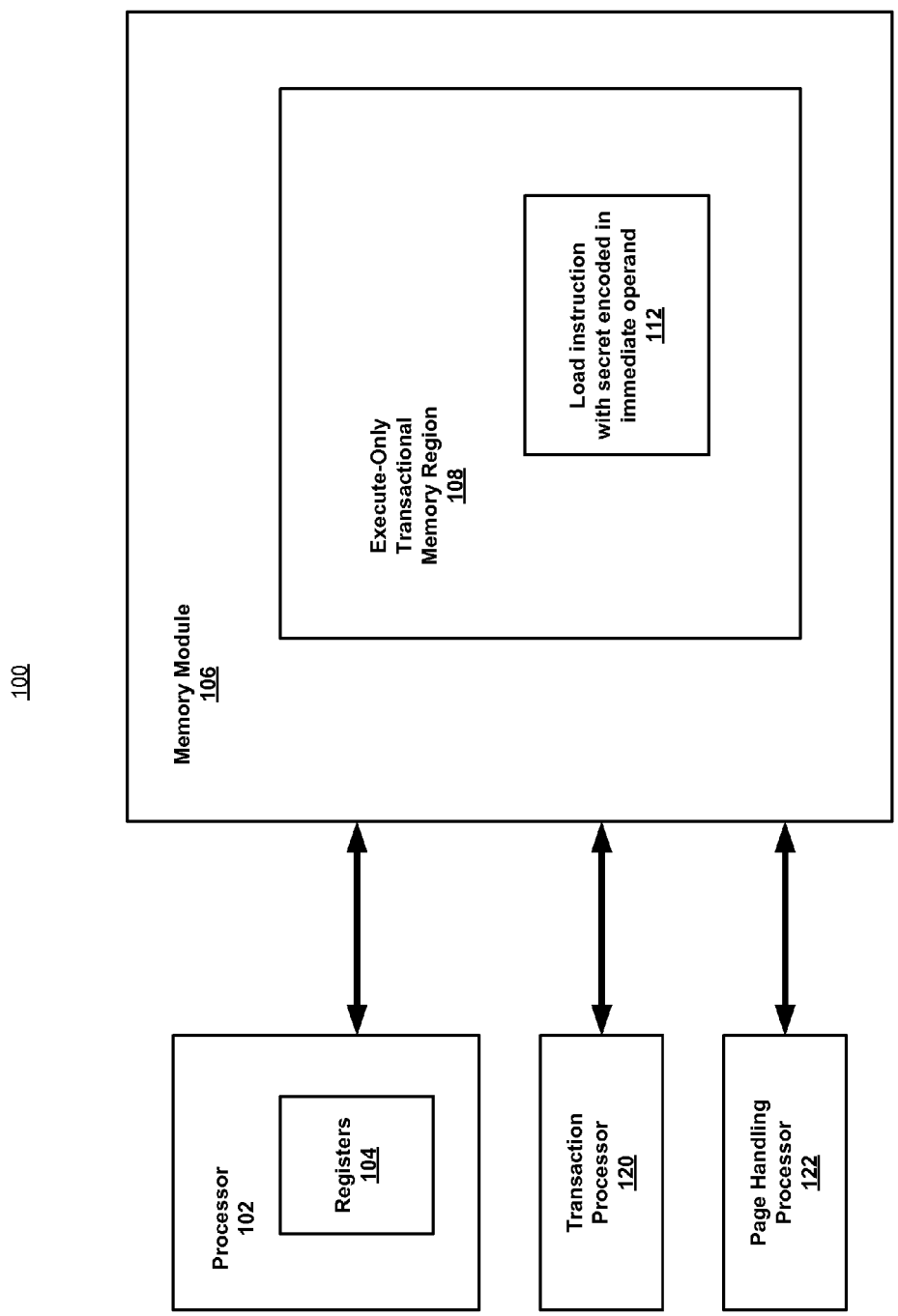
FIG. 1 illustrates a top level system diagram of an example embodiment consistent with the present disclosure.

FIG. 1 illustrates a top level system diagram 100 of an example embodiment consistent with the present disclosure. A processor or processing core 102 may be configured to execute instructions fetched from a memory module 106. The memory may include one or more transactional memory regions 108 that may be managed by a transaction processor 120, or other suitable mechanism, to implement one type of transaction execution mode. Transactional memory may generally be configured to establish and monitor the transaction regions of code and/or data. The operation of code in a transaction region may be aborted for various reasons, as explained below, resulting in the roll back or erasure of all effects stemming from the transaction up to that point. In some embodiments, transactional memory operation may be implemented using a Restricted Transactional Memory mode or RTM mode. In some embodiments, transactional execution may be implemented through hardware lock elision or other known methods.

The memory may further be partitioned into regions called pages (e.g., code pages and data pages) and a page handling processor 122, or other suitable mechanism, may be configured to manage access to the pages. For example, access may be restricted to read-only access, write-only access, execute-only access, or any combination thereof. The type of access granted may further depend on the process or processor attempting access, the associated privilege level, whether it is a virtual machine monitor (VMM) or virtual machine (VM) guest and/or other factors. The transactional memory region 108 may encompass multiple execute-only code pages or it may encompass only a portion of a single execute-only code page.

In some embodiments, a page may be marked execute-only through control of extended page tables (EPTs) by a trusted VMM. In some embodiments, other mechanisms may be employed to mark pages as execute-only, for example based on paging, nested paging, linear or physical address range registers or other suitable mechanisms. For example: some device virtualization technologies (VT-d) may be configured by the VMM to block device access to execute-only pages; memory address segmentation modes may be used to mark linear address ranges as execute-only; and instructions may be added to an ISA to provide the capability to set aside private regions of code and data.

In some embodiments, the secret may be encoded as an immediate operand of one or more load instructions 112 located in an execute-only page within a transaction region 108. The load instruction may be configured to move the secret, encoded in its immediate operand, to one or more registers 104 of the processor 102 or to any other suitable location. Additional instructions, within the execute-only page of the transaction region, may also be executed to perform any desired processing operations based on the secret. For example, the secret may be an encryption key and the additional processing may use the key to encrypt or decrypt other data. As will be described in greater detail below, the formatting and configuration of the load instruction 112, as well as the use of execute-only pages and transactional execution modes, may prevent unauthorized access to the secret, including attempted adversarial attacks that involve jumping to unintended entrypoints in the code.

In some embodiments, a new load instruction 112 may be defined and implemented for the instruction set architecture (ISA) of a processor or family of processors. The operation code (opcode) of the new instruction may be selected so as not to conflict with existing instruction opcodes. This new instruction, which will be referred to as XMOV herein, may be configured to load the secret encoded in the immediate value (operand of the instruction) into a register of the processor (or other suitable location) when transactional mode is active. If the XMOV instruction is executed when transactional mode is not active, however, the secret is not loaded. Instead, the XMOV may act as a NOP instruction, or load zeros (or some other constant) or generate an "undefined opcode" exception. The opcode for the XMOV instruction, as well as any associated modifier and attribute bytes, may be selected, as described below, to prevent an adversary from learning or inferring anything about the secret by jumping to an unintended entrypoint in the instruction.

It will be appreciated that the confidential data protection embodiments disclosed herein may be supplemented with other techniques including known encryption and data integrity protection techniques. Data integrity protection, as used herein, refers to the prevention of unauthorized modification of data without detection of such modification. For example, at least a portion of the transactional memory region 108 and/or execute-only code page may be encrypted and/or subject to integrity protection mechanisms.

Figure 2:
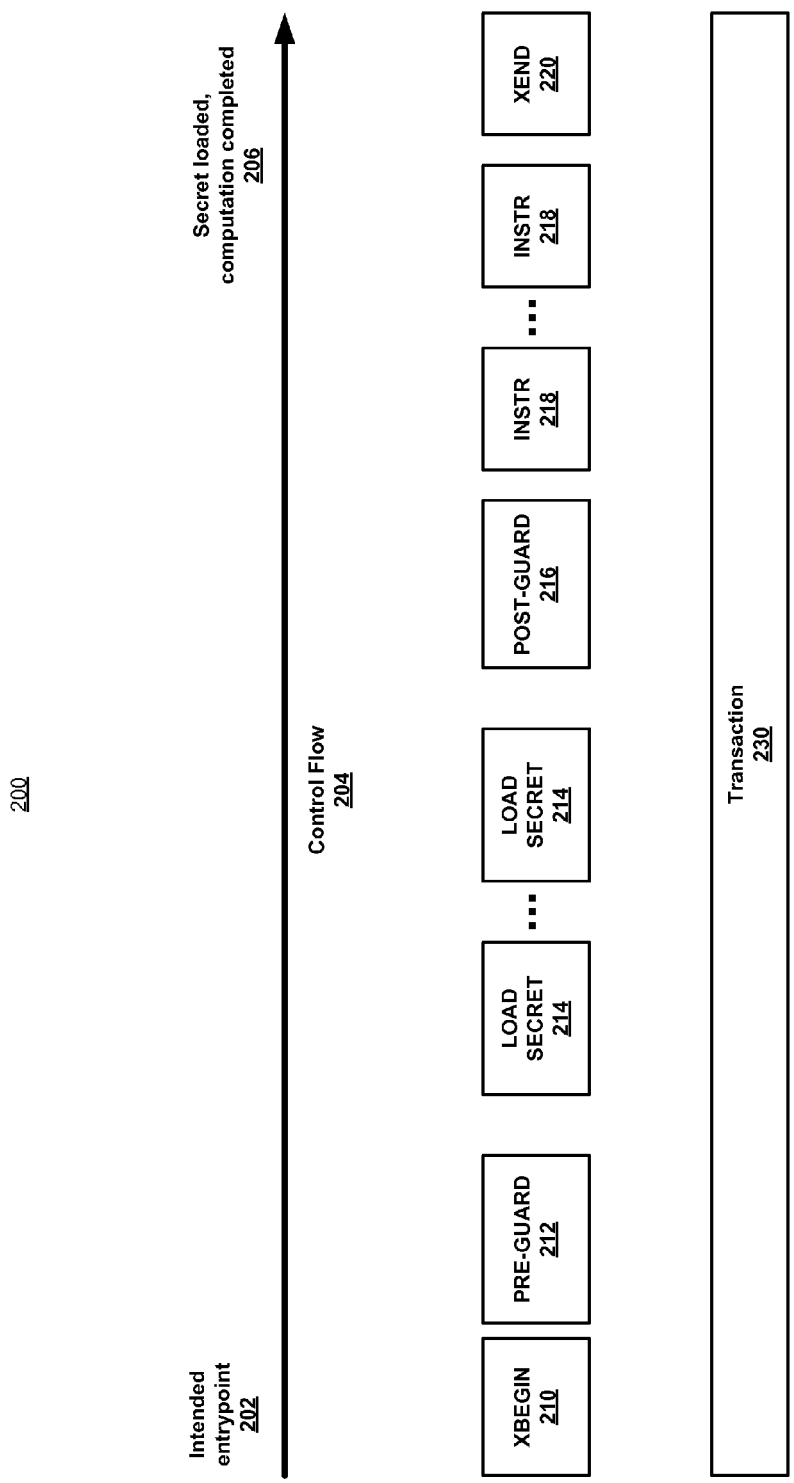
FIG. 2 illustrates a control flow diagram of one example embodiment consistent with the present disclosure.
Figure 3:
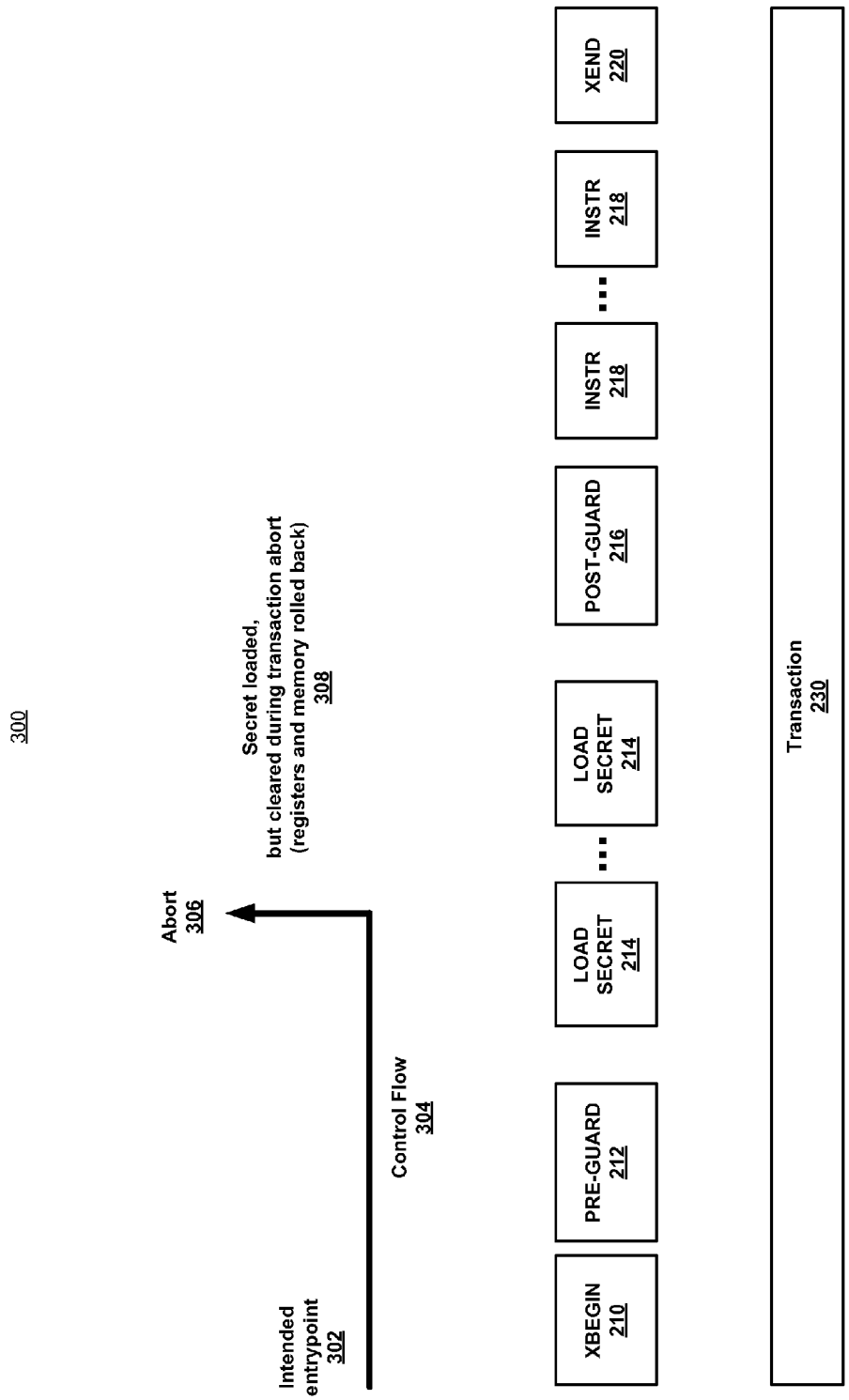
FIG. 3 illustrates a control flow diagram of another example embodiment consistent with the present disclosure.
Figure 4:
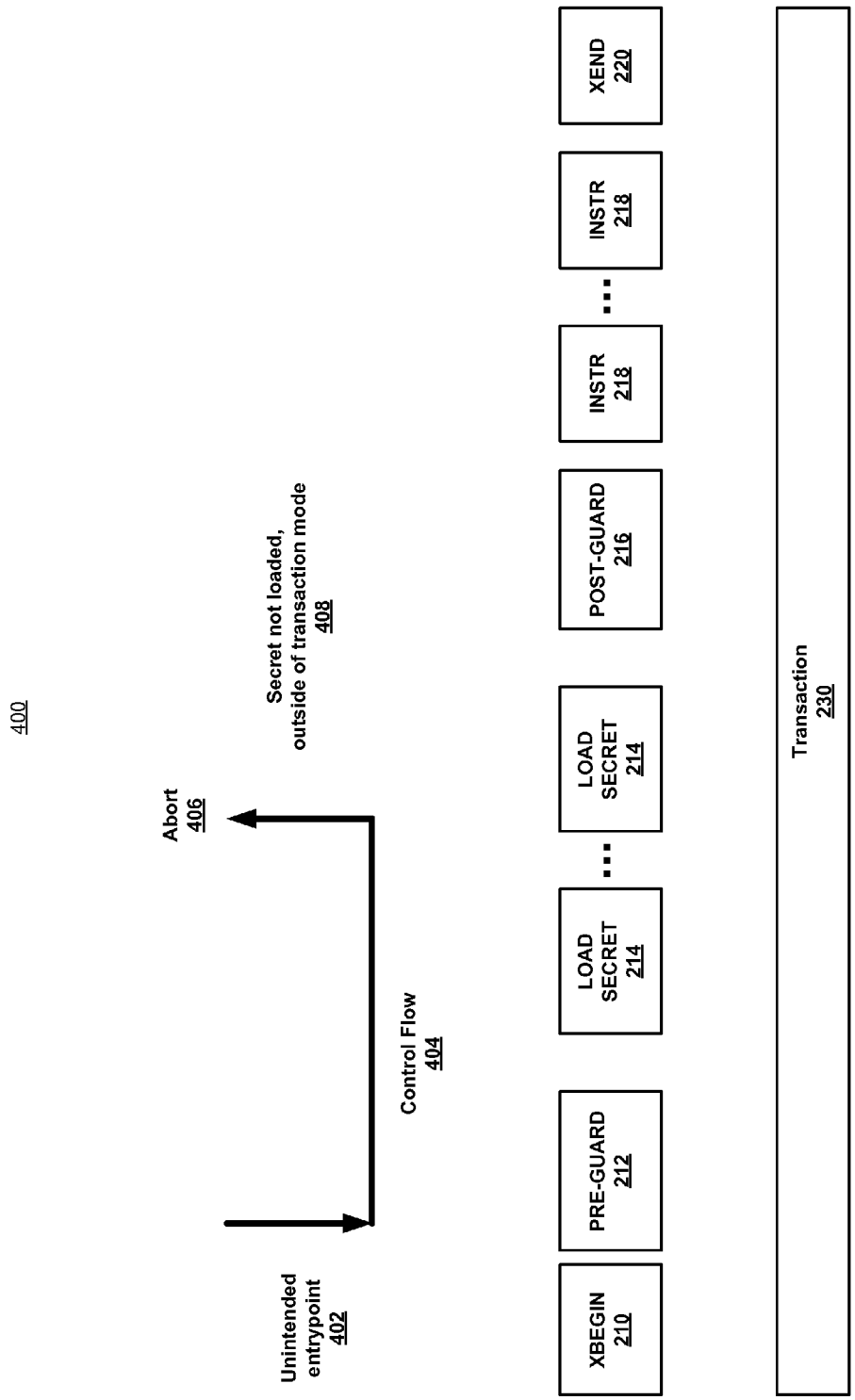
FIG. 4 illustrates a control flow diagram of another example embodiment consistent with the present disclosure.

FIGS. 2 through 4 illustrate control flow diagrams of one example embodiment consistent with the present disclosure. In FIG. 2, a control flow 204 is shown for a transaction that completes successfully. A transaction 230 may be delimited by an XBEGIN instruction 210 and an XEND instruction 220 that defines the transaction or transactional region. The use of specific instruction names, such as XBEGIN and XEND as provided by certain Intel processors, is done for illustrative purposes only. It will be appreciated that other processor families may provide similar capabilities using different naming conventions but that the concepts described herein may be generally extended to these other processor types.

The control flow 204 begins at the intended entry point 202 and the secret is loaded through one or more load secret instructions 214 (e.g., XMOVs). The operation of the pre-guard code 212 and post-guard code 216 will be described in greater detail below, but generally provide an additional safety check surrounding the load secret operations to further prevent access through unintended entrypoints. After the secrets are loaded, additional instructions 218 may be executed to perform any desired processing that may be based on or otherwise involve the secret. The control flow (and the transaction) ends with the secret loaded and the computation completed 206.

Wrapping the processing of the secret in a transaction simplifies the process of clearing out secret data by relying on hardware support to roll back changes during an abort of the transaction. Transactional mode prevents software executing outside of the transaction from viewing memory changes until the transaction commits (e.g., the XEND instruction). Thus, the transaction clears any registers and/or memory locations that may have stored secrets prior to the commit so that those secrets will not be visible outside of the transaction.

In FIG. 3, a control flow 304 is shown for a transaction that begins execution at the intended entrypoint 302 but subsequently aborts 306, for any reason. Although the secret may have been loaded before the abort occurs, the transaction processor 120 (or other transactional memory support mechanism) clears the secret by clearing or rolling back all relevant registers and memory to an earlier state, for example a state prior to the beginning of the transaction.

In FIG. 4, a control flow 404 is shown for a transaction that begins execution at an unintended entrypoint 402. This may occur, for example, if an adversary attempts to jump into the code past the XBEGIN instruction to load the secret outside of transactional mode and then regain control flow, for example with an interrupt, to read the secret from the loaded register. In this case, however, because the load secret 214 uses the XMOV instruction, the fact that transactional mode is not active causes the XMOV instruction to generate a fault or exception rather than loading the secret. In some embodiments, the XMOV instruction may load a zero or some other constant unrelated to the secret. The fault may then be handled by a VMM or other trusted mechanism, which may take any suitable action to prevent the adversary from gaining advantage.

Figure 5:
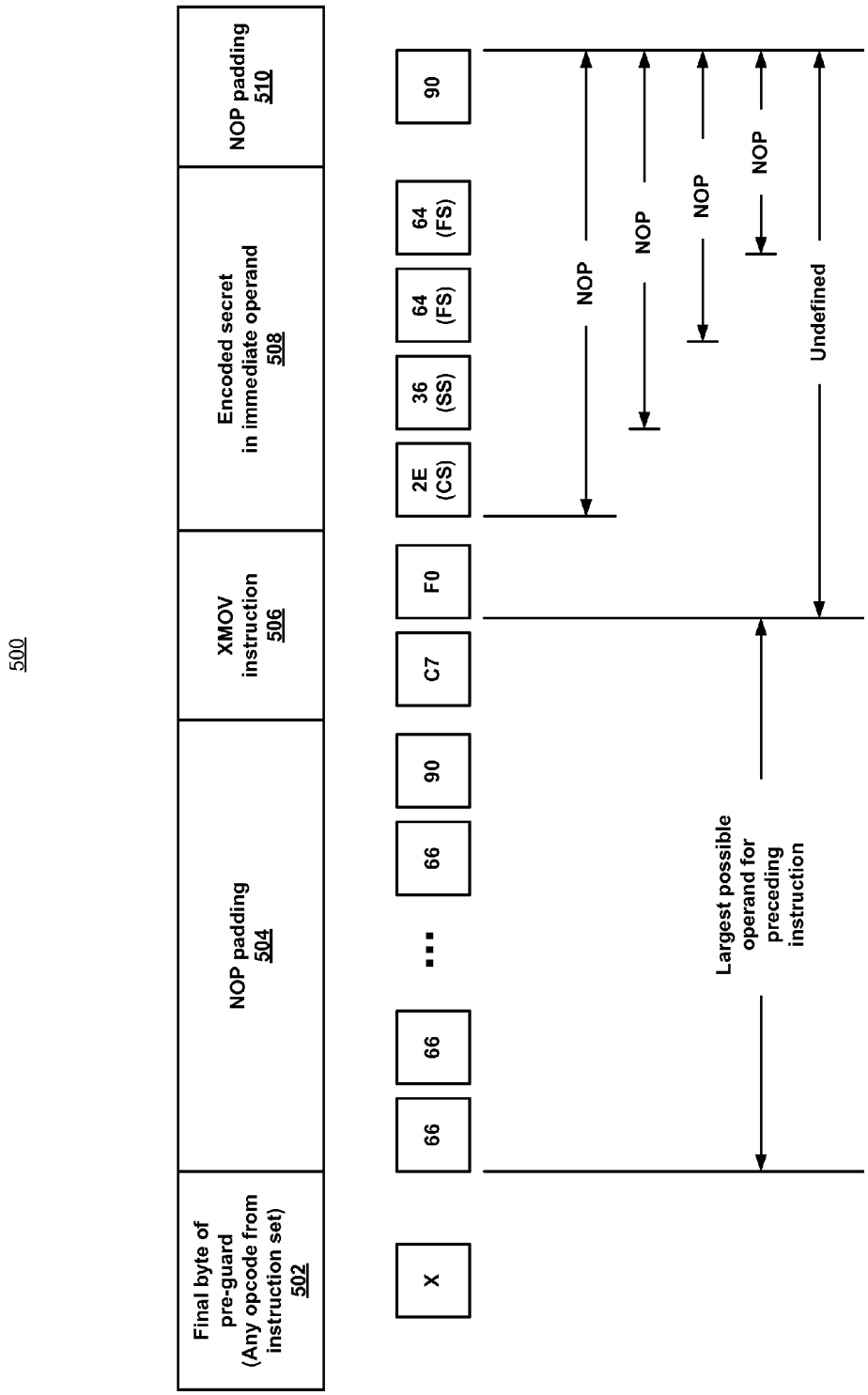
FIG. 5 illustrates an instruction pipeline of another example embodiment consistent with the present disclosure.

FIG. 5 illustrates an instruction pipeline 500 of another example embodiment consistent with the present disclosure. In some embodiments, the system may be configured to protect against an additional type of adversarial attack based on unintended entrypoints. As described above, the secret will not be loaded by the XMOV instruction 506 if it is reached through an unintended entrypoint. However, if any arbitrary instructions or byte sequences are permitted before the XMOV instruction, an adversary might jump into that byte sequence at a point where the sequence of bytes (starting at that point and possibly extending into the XMOV instruction and secret data) happened to correspond to some valid but unintended instruction of the processor under a particular ISA. Execution of this unintended instruction would generally cause some side effect on the processor, processor state, registers and/or memory. This effect might be observed and analyzed by the adversary to obtain clues about the secret. For example, the adversary may analyze aspects of the instruction's execution such as timing or effects on architectural state (e.g. registers or metrics visible through performance counters) to obtain clues about the secret.

To prevent this from happening, a NOP padding region 504 may be inserted before the XMOV instruction. The padding is constructed of a series of bytes, the values of which are chosen such that their execution (starting at any point within the sequence) would result in an undefined opcode exception or an ignored NOP under that ISA. During normal execution, from the intended execution point, the NOP padding would act as a NOP that does not interfere with the execution of the XMOV instruction.

The length of the NOP padding is selected to match the longest possible sequence of operands (in terms of total byte length) that could be associated with the final byte 502 of the pre-guard 212, in order to handle the potential situation in which that final byte was interpreted as an opcode reached through an unintended entrypoint jump by the adversary.

The opcode for the XMOV instruction may also be chosen such that jumping into an unintended point in the opcode results in an undefined opcode exception or an ignored NOP. Additionally, the secret 508 may also be encoded to achieve this unintended entrypoint protection. For example, in a particular ISA, the length of an immediate operand may be 4 bytes and the choices for each of those bytes may be constrained to 8 possible values that comply with the unintended entrypoint NOP requirements. In such case, the 8 possible values may be mapped to 3 bits of secret data. This would provide for the encoding of 12 bits of secret data in the 4 bytes of the immediate operand 508 of each XMOV instruction 506. Any number of XMOV instructions may thus be pipelined to accommodate the representation of secret data of arbitrary bit length in 12 bit increments. Thus, for example, if the secret data is a 128 bit Advanced Encryption Standard (AES) key, eleven XMOV instructions would be required.

In some embodiments, for example where a VMM is part of a trusted computing base and the VMM generates an exit for certain privileged/restricted instruction opcodes (like port I/O instructions), these additional opcodes may be used to expand the set of encoding possibilities for the secret.

In some embodiments, additional NOP padding 510 may be inserted after the encoded secret 508 to ensure that any sub-portions of the secret cannot be combined with bytes of the post guard 216 to create potentially valid instructions.

To further illustrate this instruction pipeline in the context of a particular Intel ISA, byte value sequences are shown (encoded in hexadecimal) for one possible example. In this example, the final byte of the pre-guard 502 is labeled as an "X" to indicate that it is could be any value. The NOP padding 504, which may be up to 6 bytes long to accommodate the largest possible operand size of the preceding instruction 502 (in this example ISA), contains values 66, 66, . . . 90 that will be interpreted as a single NOP regardless of the entrypoint within that field. The value 90 represents a single byte NOP instruction, in this ISA, and the value 66 is an instruction prefix that has no effect on the NOP, in this ISA. The XMOV instruction 506 is chosen as C7F0 since it is an available (currently unused) opcode in this ISA and satisfies the requirement that jumping to an unintended point in the opcode is undefined or an ignored NOP, in combination with one or more of the immediate operand bytes that are selected from a restricted set of possibilities. In this example, the possible immediate operand bytes are 26, 2E, 36, 3E, 64, 65, 66 and 67 which represent NOP prefixes, in this ISA, for the final single byte NOP 510. For the purpose of this description, it may be assumed that these NOP prefixes have execution latencies that are indistinguishable from other NOPs comprising any different combination of the same total number of prefixes, thus preventing analysis of their values based on timing. These 8 possibilities allow for the encoding of 3 bits of secret data in each of the immediate operand bytes. The following table represents one example implementation of the secret encoding:

| Secret Value (binary) | Prefix (Hex) | Prefix (binary) |
|---|---|---|
| 000 | 36 | 0011 0110 |
| 001 | 3E | 0011 1110 |
| 010 | 26 | 0010 0110 |
| 011 | 2E | 0010 1110 |
| 100 | 64 | 0110 0100 |
| 101 | 65 | 0110 0101 |
| 110 | 66 | 0110 0110 |
| 111 | 67 | 0110 0111 |

The encoding defined in this table allows for each 3 bit portion of the secret to be decoded as follows:

Secret=$\{P_6, P_4 \text{ xor } P_1, P_3 \text{ xor } P_0\}$ where $P_N$ is the Nth bit of the prefix (N=0 is least significant bit) and xor is the Exclusive-OR operation, and the commas indicate concatenation of these bits.

In some embodiments, the XMOV instruction may decode the secret immediate values according to a formula such as this and place them into the destination register after shifting the existing contents of the destination register to make space for the new data.

In some embodiments, the XMOV instruction may load a constant value that is larger than a single general-purpose register into multiple general-purpose registers or into one or more special-purpose registers. It may also decode the secret immediate values during the load process.

In some embodiments, the XMOV instruction may load the secret immediate values into one or more registers that clear on any asynchronous event, such as, for example, a system management interrupt (SMI) a non maskable interrupt (NMI), a page fault, a debug exception, etc. Each register in this set may require that a sufficient number of XMOV instructions be previously executed to fully populate all bit positions in the register prior to permitting the value to be read out of the register. This is to address the risk of attack through unintended entrypoint as described below in connection with FIG. 6.

In some embodiments, for example on architectures that restrict the destinations of branch instructions to boundaries that are more coarsely aligned than single bytes, other encodings may be used to provide greater encoding density.

Figure 6:
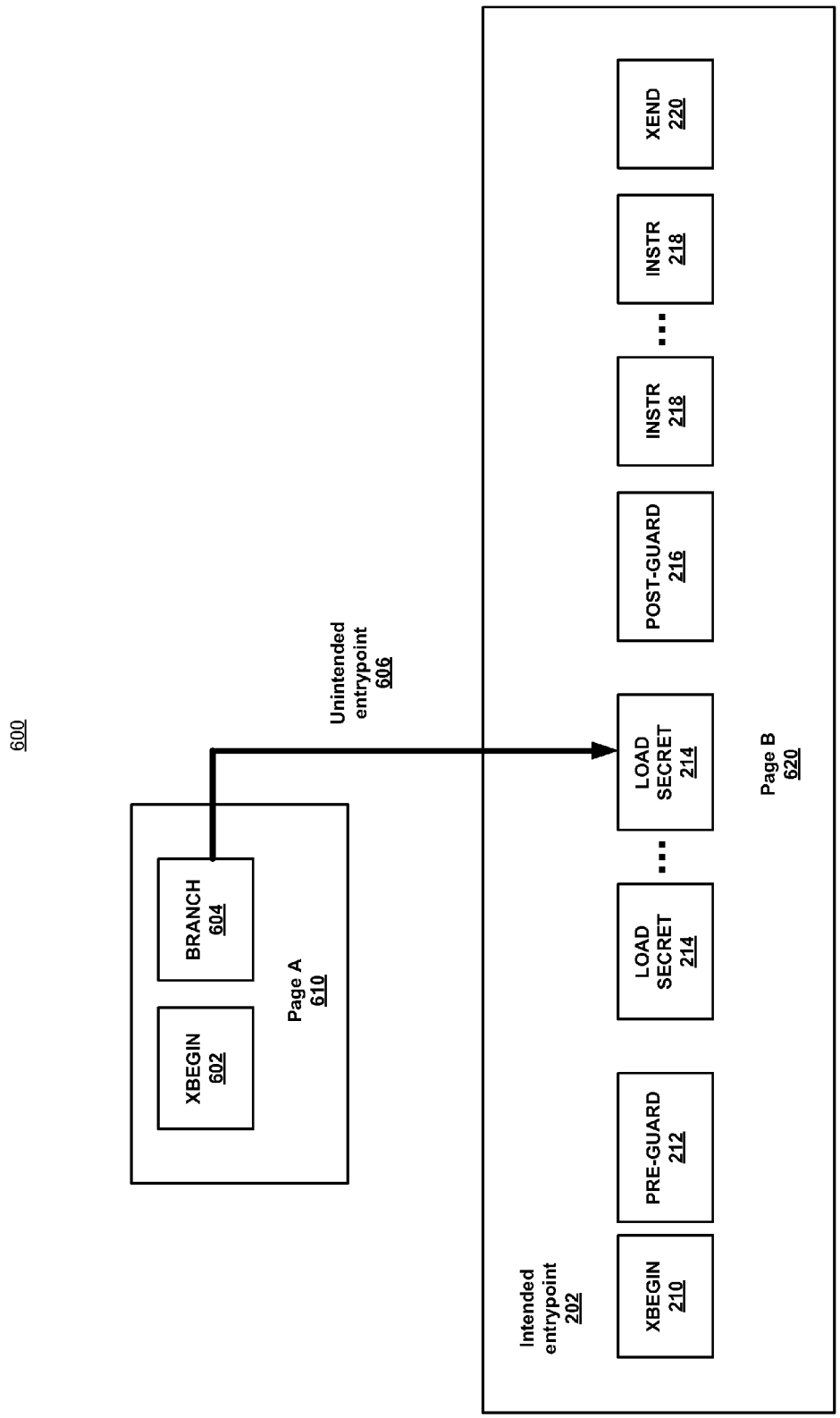
FIG. 6 illustrates a control flow diagram of another example embodiment consistent with the present disclosure.

FIG. 6 illustrates a control flow diagram 600 of another example embodiment consistent with the present disclosure. In this example, the operation of the pre-guard code 212 and post-guard code 216 is described in greater detail as a mechanism to prevent another form of attack through unintended entrypoint 606 to load and process a portion of the secret. In this scenario, an adversary may execute an XBEGIN instruction 602, on page A 610, to initiate a transaction, and then jump (e.g., using a branch instruction 604) to an unintended entrypoint 606 on the execute-only page B 620. Execution at the unintended entrypoint 606, while in transaction mode, may induce partial loading of the secret 214. Although the secret will not directly be made visible, subsequent processing of the partially loaded secret, by instructions 218, may enable certain types of known cryptographic attacks. To prevent this, the pre-guard code 212 may be configured to load a secret decoding constant into a first location (e.g., a register or memory location) and the post-guard code 216 may be configured to load the same secret decoding constant into a second location (e.g., different register or memory location) and to compare them to verify that the pre-guard and post-guard secret constants match. If the verification fails, the post-guard code may generate an undefined opcode exception. In some embodiments, the pre- and post-guard code may employ additional load secret instruction sequences 214 internally to prevent the adversary from manipulating the decoding process by specifying other constants.

In some embodiments, as an alternative to checking secret decoding constants, a new instruction, referred to as XCHECK, may be defined to verify that the current execution is on the same page as the instruction that entered the transactional mode (e.g., XBEGIN). The check may verify either that the linear addresses of the XCHECK and XBEGIN instructions are within a single 4 KB-aligned region, or that both instructions are mapped by the same Translation Lookaside Buffer (TLB) entry, which may or may not map a region larger than 4 KB. In some embodiments, XCHECK may also accept a parameter to extend the check so that it will succeed if both instructions are within a larger aligned region, e.g. 2 MB. The parameter could specify the region size. If the verification fails, the transaction is aborted. In some embodiments, this check could be performed as part of the XMOV instruction.

In some embodiments, the post-guard code 216 may further be configured to check that the default operand size is 32 bits to prevent an adversary from manipulating the execution of the code that processes the secrets 218, for example by specifying a 16 bit default operand size through modification of the code segment descriptor. Post-guard code 216 may also check that either 32- or 64-bit mode is in use. This may be accomplished by including an instruction that generates an undefined opcode exception when used in an unapproved operating mode.

In some embodiments, the post-guard code 216 may further be configured to check that an acceptable mode of transactional execution is in use. For example, in some Intel ISAs, an XTEST instruction may be employed to assert that a transactional execution mode referred to as Transactional Synchronization Extension (TSX) is in use. In general, many types of transactions may be available, each having different properties, which may necessitate code changes to allow them to be safely used. For example, not all types of transactions may clear secrets from certain registers. Thus, whether or not a particular transaction mode is acceptable will depend on the nature of the code. Transactional execution type checks can be omitted when the VMM or other entity trusted to install the transactional memory region 108 knows that only acceptable types of transactions are available.

In some embodiments, all code in a transaction up to and including the post-guard code 216 should be configured to execute with the same control flow in all processor operating modes, with some exceptions as described below. A default operand size check may be placed after each contiguous sequence of XMOV instructions prior to any instruction having a length that is affected by the default operand size.

One example exception to the control flow requirement in the previous paragraph is that a 16-bit default operand size may reduce the operand length of an XMOV instruction from 32 bits down to 16 bits. However, the two excluded operand bytes are executed as ignored prefixes applied to the following NOP padding. The disallowed operand size will be detected by the check following the sequence of XMOV instructions.

In some embodiments there may be additional control flow considerations. For example, it may be desirable to avoid using indirect branches in transactions, other than to destinations specified solely in registers based on addresses relative to the instruction pointer register (RIP). The use of memory locations as operands to indirect branches could permit an adversary to manipulate control flow if the adversary controls those memory locations. Furthermore, the use of precomputed code addresses, rather than RIP-relative addresses, is unsafe if adversaries control linear-to-physical address mappings.

In some embodiments, linear-to-physical (or virtual to physical) address mappings may also be controlled if it is possible for the mapping for the current code page to change while a transaction is executing or if a single transaction needs to invoke multiple code pages. To maintain security, the transaction needs to be able to determine the addresses of the pages to which a jump may be required. This may also apply to data pages if the transaction needs to access data pages.

In some embodiments, in which it is not possible for the mapping of the current code page to change while a transaction is executing, it may be desirable to support transactional regions larger than the minimum possible page size. In the absence of any mechanism to allow the code in the transactional region to determine the extent of the current code page, it may need to assume that the current code page has the minimum possible size. A new instruction, referred to as RDTLB, may be defined to read the size of the current code page and place that size into a register. Alternatively, the instruction could assert that the current code page mapping is a certain size, perhaps with that size being determined by an operand to the RDTLB instruction.

Although one type of transaction mode includes restricted transactional memory (RTM), not all processors support RTM. In such cases, a lightweight version of RTM may be implemented, as an alternative, to satisfy the security requirements of XMOV-based secret protection described herein. This lightweight RTM may perform aborts, and define and invoke abort handlers, but need not actually support full transactional memory. The transaction could be limited to storing unencrypted secrets in registers rather than in memory. The processor may roll back register contents or simply clear registers during aborts. Some register contents may be preserved during aborts, such as the stack pointer register (RSP), so that software operates correctly even if interrupted just after an abort, and secrets would not be stored in such registers. Alternative transactional modes may support different operations than existing modes. For example, even if accesses to processor configuration registers such as control registers and Machine State Registers (MSRs) cause existing modes to abort, they may not cause alternative modes to abort.

Since transactions may abort for a variety of reasons, some of which may be associated with recurring events, a fallback mechanism may be provided in some embodiments. The fallback mechanism is configured to avoid a situation where the transaction fails to make forward progress due to recurring aborts. A threshold may be set for a maximum number of consecutive aborts, after which the VMM or some other suitable trusted mechanism may be invoked to perform the function that was to be performed under the transaction.

In an alternative embodiment, for example when it is not possible or feasible to define and implement a new instruction such as XMOV, secrets may be protected based on existing transactional support. A page containing a secret is marked execute-only, for example using a trusted VMM to control extended page tables (EPTs) or through other known mechanisms. The secret is encoded as an immediate value to one or more MOV RSP instructions (i.e., instructions that load data to a stack pointer register). The immediate values may be configured to include instruction prefixes that are ignored when preceding a NOP instruction. This is to prevent an adversary from learning any part of the secret by jumping directly to some part of the secret, executing the resultant instruction, generating an interrupt to regain control, and then analyzing aspects of the instruction's execution to obtain clues about the secret. It may also prevent an adversary from performing a similar attack by jumping to some byte that is part of the MOV instruction, or prior to the MOV instruction. The resultant unintended instruction may be prevented from revealing anything about the secret by preventing any possible unintended instruction from incorporating any part of the secret. For example, this can be accomplished by preceding each such instruction with a NOP instruction of appropriate length.

The use of RSP as the register into which the secret is loaded is particularly significant when the processor is executing in ring 0 privilege mode. If an interrupt arrives in ring 0 mode when a secret is loaded in RSP, a stack fault exception will occur because the selected encoding for the secret will cause the value in RSP to be invalid (or non-canonical) in 64-bit mode. The term canonical refers to a format used in some 64 bit architectures where only the least significant 48 bits of address are used and the upper 16 bits are simply sign-extended. Paging or segmentation could be used to limit the valid stack addresses in 32- or 64-bit modes, and an encoding could be selected to cause a general protection exception or page fault exception when an attempt is made to use the stack when a secret is loaded in RSP. In either of these, a double fault will be generated and can be intercepted by the VMM.

An additional concern, however, is that an adversary may be able to prevent a fault from occurring by manipulating Interrupt Stack Table (IST) settings. The IST is a table configured to store RSP values that can be associated with Interrupt Descriptor Table (IDT) entries. The interrupt descriptors identify the various possible interrupts and associated interrupt handlers. If an IDT entry references the IST, the RSP will be updated to the specified value in the IST prior to delivering the interrupt. Thus, the VMM needs to control the guest OS's use of the IDT and/or IST in order for this secret protection scheme to work. For example, the VMM could set all IST entries to non-canonical or otherwise fault-generating addresses and intercept the resultant double fault that would occur when they are used. The VMM would then clear out any secrets from registers. Also, since the IST and IDT are referenced by linear addresses, the VMM will need to control the guest linear-to-physical address mappings for the relevant addresses in addition to the corresponding physical memory pages and the IDT Register as well as other entities that reference the ISTs (e.g., task registers and task state segment (TSS) data structures.

Storing a secret in RSP and controlling the IST to lead to a double fault is insufficient, however, for protecting secrets when the processor is executing in the lower ring 3 privilege level mode. Generally, in this mode, regardless of IST use, a new stack will be selected when delivering an interrupt or exception to a lower ring level (i.e., higher privilege mode). To allow processing of secrets in ring 3, the VMM would need to intercept all possible interrupts and exceptions and clear any secrets that may be loaded in memory and registers.

The use of transaction processing can simplify the process of clearing out secret data by relying on hardware support for rolling back changes during an abort. It can also increase the flexibility of the programming model by supporting memory operations. This assumes, however, that the transaction can reliably direct memory writes to a predictable location, which may be challenging when paging is in use. A drawback to this approach therefore is the possibility that the linear-to-physical mapping for a given linear address may change after a secret has been written to the address and before that location is cleared by the transaction. One solution is to avoid storing secret data in memory or to limit the storage of secret data to address spaces that are not subject to address translation, for example registers or a scratch pad memory that is reserved for this purpose. The scratch pad memory may be accessed by newly defined instructions and configured to be erased in response to a transaction abort. Another solution is to cause the processor to abort the transaction if the TLB is updated, particularly if an XMOV instruction has been executed in that transaction.

This approach may be further optimized by generating the abort only if a TLB entry that is actually relevant to the execution of the current transaction (e.g. the corresponding memory has been written to during the transaction) is updated. Other embodiments may employ any suitable method for controlling linear to physical mappings.

In some embodiments, additional protections may be implemented to prevent an interrupt handler from accessing the secret data. While some forms of transactional execution may be configured to deliver asynchronous interrupts only after aborting any active transactions (to prevent secret data in registers from being made available to the interrupt handler), this cannot be guaranteed in general, particularly for future versions. In some embodiments, therefore, the XMOV instruction may be configured to switch the transaction into a more conservative mode that causes an abort in response to selected events (e.g., NMIs, etc). Alternatively, an MSR may be used to switch the transaction into the more conservative mode and to prevent the XMOV instruction from loading secret data unless in that conservative mode. Yet another alternative is to block asynchronous events until the current transaction commits or aborts, although this may result in system lockups or the dropping of interrupts in the case of excessively long transactions.

Figure 7:
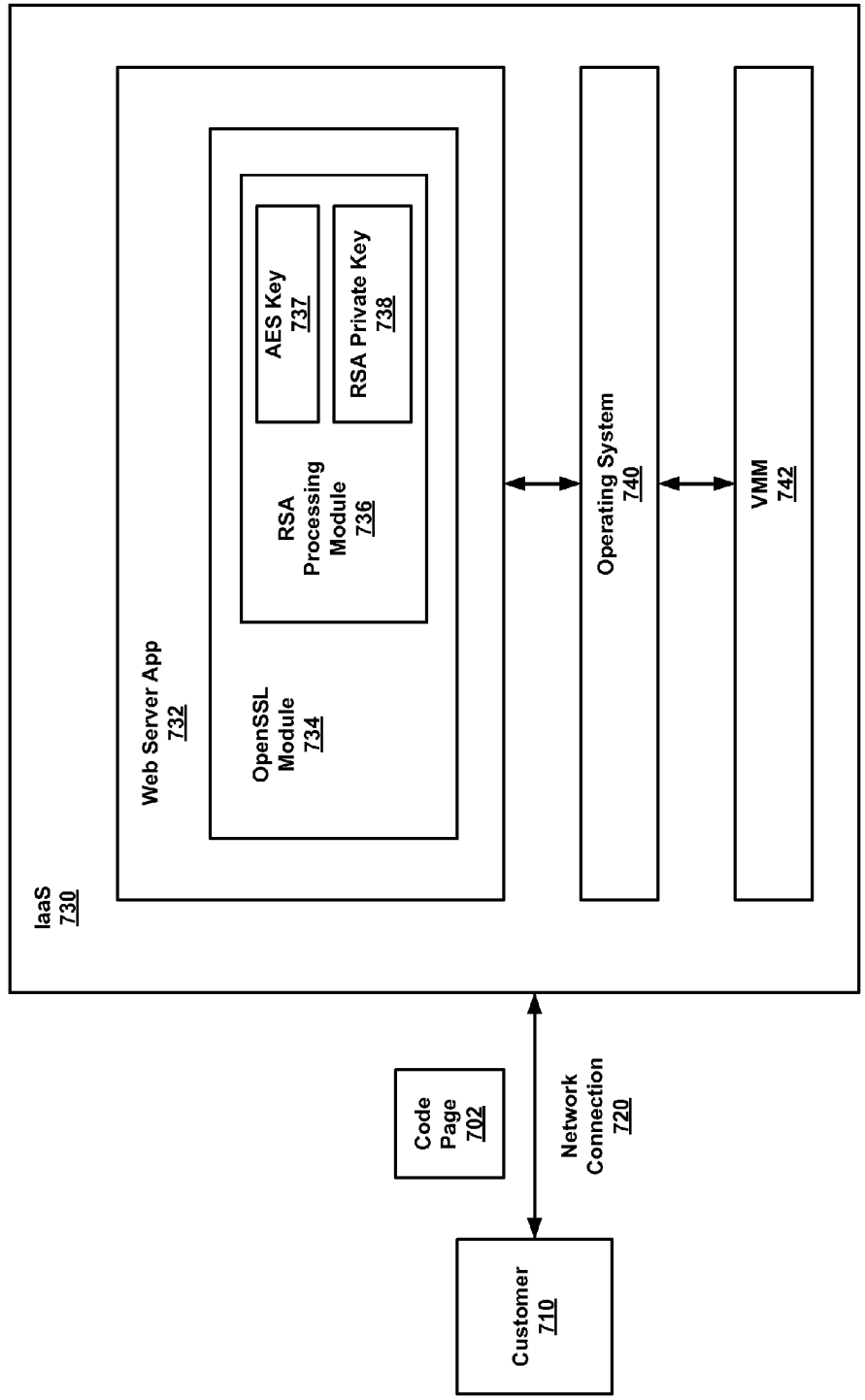
FIG. 7 illustrates a block diagram of another example embodiment consistent with the present disclosure.

FIG. 7 illustrates a block diagram 700 of another example embodiment consistent with the present disclosure. In cloud-based computing, for example where a $3^{rd}$ party provider hosts a virtualized computing resource over the internet (also known as "Infrastructure as a Service" or IaaS), embodiments of the present disclosure may be used to prevent theft of cryptographic keys. In this example, a customer or client 710 connects to the IaaS 730 over a network connection 720 that may be configured as a secure connection, for example by providing a secure tunnel. The customer may request attestation from the IaaS, using any suitable mechanism, to verify that the IaaS system software is secure. For example, the customer may verify that a trusted VMM 742 is in place. The customer may then deploy a virtual machine (VM) to the IaaS.

The customer sends a code page 702 over the secure tunnel to the VMM. The code page includes an embedded AES key 737 configured to unwrap an RSA (Rivest-Shamir-Adleman) private key 738. The embedded AES key 737 may be stored as a secret in the immediate operand of one or more XMOV instructions included in the code page, in accordance with embodiments described previously.

The VM launches and in turn starts up a web server application 732. The web server application 732 includes an OpenSSL module 734 which is configured for secure encrypted communication with the customer using the Secure Socket Layer (SSL) protocol. The OpenSSL module 734 performs a system call (also referred to as a hypercall) to the VMM 742 to request access to the RSA private key 738. In response, the VMM installs an RSA processing module code page 736 in the OpenSSL module and configures it for execute-only mode (for example, using EPTs). The RSA processing module 736 is based on the code page 702 provided by the customer. During operation, the OpenSSL module invokes that RSA processing module 736 to unwrap the RSA private key 738 using the embedded AES key 737, whenever an RSA operation needs to be performed.

Figure 8:
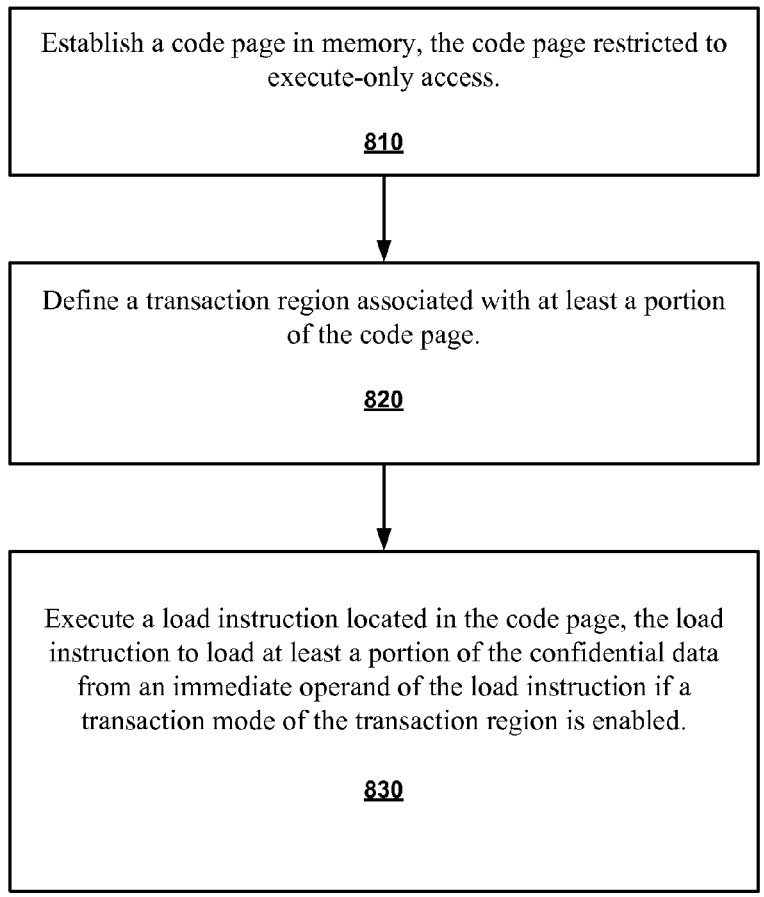
FIG. 8 illustrates a flowchart of operations of another example embodiment consistent with the present disclosure.

FIG. 8 illustrates a flowchart of operations 800 of another example embodiment consistent with the present disclosure. The operations provide a method for protecting confidential data with transactional processing in execute-only memory. At operation 810, a code page is established in memory. The code page is set to be restricted to execute-only access. At operation 820, a transaction region is defined. The transaction region is associated with at least a portion of the code page. At operation 830, a load instruction is executed from the code page. The load instruction is configured to load at least a portion of the confidential data from an immediate operand of the load instruction, if a transaction mode of the transaction region is enabled. If the transaction mode is not enabled, the load instruction may generate a fault.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may include, for example, singly or in any combination, hardwired circuitry, programmable circuitry, state machine circuitry, and/or firmware that stores instructions executed by programmable circuitry. An application (or "App") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for protecting confidential data with transactional processing in execute-only memory. The following examples pertain to further embodiments.

According to Example 1 there is provided a system for protecting confidential data. The system may include a memory module to store an execute-only code page; a transaction processor to enforce a transaction region associated with at least a portion of the code page; and a processor to execute a load instruction fetched from the code page, the load instruction to load at least a portion of the confidential data from an immediate operand of the load instruction if a transaction mode of the transaction region is enabled.

Example 2 may include the subject matter of Example 1, further including a register associated with the processor, and the load instruction is to load the confidential data to the register.

Example 3 may include the subject matter of Examples 1 and 2, and the processor is further to cause the load instruction to generate a fault if the transaction mode of the transaction region is not enabled.

Example 4 may include the subject matter of Examples 1-3, and the processor is further to cause the load instruction to load a pre-determined constant, the constant unassociated with the confidential data, if the transaction mode of the transaction region is not enabled.

Example 5 may include the subject matter of Examples 1-4, and the transaction processor is further to clear the loaded confidential data in response to an abort of the transaction mode.

Example 6 may include the subject matter of Examples 1-5, and the portion of the confidential data is encoded in the immediate operand such that the encoded data represents at least a portion of a no-operation (NOP) instruction sequence of the processor.

Example 7 may include the subject matter of Examples 1-6, and the processor is further to execute a check instruction to verify that execution is from the code page and to abort the transaction mode if the verification fails.

According to Example 8 there is provided a method for protecting confidential data. The method may include establishing a code page in memory, the code page restricted to execute-only access; defining a transaction region associated with at least a portion of the code page; and executing a load instruction located in the code page, the load instruction to load at least a portion of the confidential data from an immediate operand of the load instruction if a transaction mode of the transaction region is enabled.

Example 9 may include the subject matter of Example 8, and the load instruction is to load the confidential data to a register associated with a processor.

Example 10 may include the subject matter of Examples 8 and 9, and the load instruction is to generate a fault if the transaction mode of the transaction region is not enabled.

Example 11 may include the subject matter of Examples 8-10, and the load instruction is to load a pre-determined constant, the constant unassociated with the confidential data, if the transaction mode of the transaction region is not enabled.

Example 12 may include the subject matter of Examples 8-11, further including clearing the loaded confidential data in response to an abort of the transaction mode.

Example 13 may include the subject matter of Examples 8-12, further including clearing the loaded confidential data on exit of the transaction mode.

Example 14 may include the subject matter of Examples 8-13, further including encoding the portion of the confidential data in the immediate operand such that the encoded data represents at least a portion of a no-operation (NOP) instruction sequence.

Example 15 may include the subject matter of Examples 8-14, further including: executing a pre-guard code segment before the load instruction, the pre-guard code segment to load a selected constant into a first location; and executing a post-guard code segment after the load instruction, the post-guard code segment to load the selected constant into a second location and to verify that the content of the first and the second locations match.

Example 16 may include the subject matter of Examples 8-15, further including executing a check instruction to verify that execution is from the code page and aborting the transaction mode if the verification fails.

Example 17 may include the subject matter of Examples 8-16, and the confidential data is an encryption key and the load instruction is dynamically generated based on information received over a secure network connection.

Example 18 may include the subject matter of Examples 8-17, and at least a portion of the code page is encrypted.

According to Example 19 there is provided at least one computer-readable storage medium having instructions stored thereon which when executed by a processor result in the following operations for protecting confidential data. The operations may include establishing a code page in memory, the code page restricted to execute-only access; defining a transaction region associated with at least a portion of the code page; and executing a load instruction located in the code page, the load instruction to load at least a portion of the confidential data from an immediate operand of the load instruction if a transaction mode of the transaction region is enabled.

Example 20 may include the subject matter of Example 19, and the load instruction is to load the confidential data to a register associated with a processor.

Example 21 may include the subject matter of Examples 19 and 20, and the load instruction is to generate a fault if the transaction mode of the transaction region is not enabled.

Example 22 may include the subject matter of Examples 19-21, and the load instruction is to load a pre-determined constant, the constant unassociated with the confidential data, if the transaction mode of the transaction region is not enabled.

Example 23 may include the subject matter of Examples 19-22, further including clearing the loaded confidential data in response to an abort of the transaction mode.

Example 24 may include the subject matter of Examples 19-23, further including clearing the loaded confidential data on exit of the transaction mode.

Example 25 may include the subject matter of Examples 19-24, further including encoding the portion of the confidential data in the immediate operand such that the encoded data represents at least a portion of a no-operation (NOP) instruction sequence.

Example 26 may include the subject matter of Examples 19-25, further including: executing a pre-guard code segment before the load instruction, the pre-guard code segment to load a selected constant into a first location; and executing a post-guard code segment after the load instruction, the post-guard code segment to load the selected constant into a second location and to verify that the content of the first and the second locations match.

Example 27 may include the subject matter of Examples 19-26, further including executing a check instruction to verify that execution is from the code page and aborting the transaction mode if the verification fails.

Example 28 may include the subject matter of Examples 19-27, and the confidential data is an encryption key and the load instruction is dynamically generated based on information received over a secure network connection.

According to Example 29 there is provided a system for protecting confidential data. The system may including means for establishing a code page in memory, the code page restricted to execute-only access; means for defining a transaction region associated with at least a portion of the code page; and means for executing a load instruction located in the code page, the load instruction to load at least a portion of the confidential data from an immediate operand of the load instruction if a transaction mode of the transaction region is enabled.

Example 30 may include the subject matter of Example 29, and the load instruction is to load the confidential data to a register associated with a processor.

Example 31 may include the subject matter of Examples 29 and 30, and the load instruction is to generate a fault if the transaction mode of the transaction region is not enabled.

Example 32 may include the subject matter of Examples 29-31, and the load instruction is to load a pre-determined constant, the constant unassociated with the confidential data, if the transaction mode of the transaction region is not enabled.

Example 33 may include the subject matter of Examples 29-32, further including means for clearing the loaded confidential data in response to an abort of the transaction mode.

Example 34 may include the subject matter of Examples 29-33, further including means for clearing the loaded confidential data on exit of the transaction mode.

Example 35 may include the subject matter of Examples 29-34, further including means for encoding the portion of the confidential data in the immediate operand such that the encoded data represents at least a portion of a no-operation (NOP) instruction sequence.

Example 36 may include the subject matter of Examples 29-35, further including: means for executing a pre-guard code segment before the load instruction, the pre-guard code segment to load a selected constant into a first location; and means for executing a post-guard code segment after the load instruction, the post-guard code segment to load the selected constant into a second location and to verify that the content of the first and the second locations match.

Example 37 may include the subject matter of Examples 29-36, further including means for executing a check instruction to verify that execution is from the code page and aborting the transaction mode if the verification fails.

Example 38 may include the subject matter of Examples 29-37, and the confidential data is an encryption key and the load instruction is dynamically generated based on information received over a secure network connection.

Example 39 may include the subject matter of Examples 29-38, and at least a portion of the code page is encrypted.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for protecting confidential data, said system comprising:
   a memory module to store an execute-only code page;
   a transaction processor to enforce a transaction region associated with at least a portion of said code page; and
   a processor to execute a load instruction fetched from said code page, said load instruction to load at least a portion of said confidential data from an immediate operand of said load instruction if a transaction mode of said transaction region is enabled.

2. The system of claim 1, further comprising a register associated with said processor, wherein said load instruction is to load said confidential data to said register.

3. The system of claim 1, wherein said processor is further to cause said load instruction to generate a fault if said transaction mode of said transaction region is not enabled.

4. The system of claim 1, wherein said processor is further to cause said load instruction to load a pre-determined constant, said constant unassociated with said confidential data, if said transaction mode of said transaction region is not enabled.

5. The system of claim 1, wherein said transaction processor is further to clear said loaded confidential data in response to an abort of said transaction mode.

6. The system of claim 1, wherein said portion of said confidential data is encoded in said immediate operand such that said encoded data represents at least a portion of a no-operation (NOP) instruction sequence of said processor.

7. The system of claim 1, wherein said processor is further to execute a check instruction to verify that execution is from said code page and to abort said transaction mode if said verification fails.

8. A method for protecting confidential data, said method comprising:
   establishing a code page in memory, said code page restricted to execute-only access;
   defining a transaction region associated with at least a portion of said code page; and
   executing a load instruction located in said code page, said load instruction to load at least a portion of said confidential data from an immediate operand of said load instruction if a transaction mode of said transaction region is enabled.

9. The method of claim 8, wherein said load instruction is to load said confidential data to a register associated with a processor.

10. The method of claim 8, wherein said load instruction is to generate a fault if said transaction mode of said transaction region is not enabled.

11. The method of claim 8, wherein said load instruction is to load a pre-determined constant, said constant unassociated with said confidential data, if said transaction mode of said transaction region is not enabled.

12. The method of claim 8, further comprising clearing said loaded confidential data in response to an abort of said transaction mode.

13. The method of claim 8, further comprising clearing said loaded confidential data on exit of said transaction mode.

14. The method of claim 8, further comprising encoding said portion of said confidential data in said immediate operand such that said encoded data represents at least a portion of a no-operation (NOP) instruction sequence.

15. The method of claim 8, further comprising:
   executing a pre-guard code segment before said load instruction, said pre-guard code segment to load a selected constant into a first location; and
   executing a post-guard code segment after said load instruction, said post-guard code segment to load said selected constant into a second location and to verify that the content of said first and said second locations match.

16. The method of claim 8, further comprising executing a check instruction to verify that execution is from said code page and aborting said transaction mode if said verification fails.

17. The method of claim 8, wherein said confidential data is an encryption key and said load instruction is dynamically generated based on information received over a secure network connection.

18. The method of claim 8, wherein at least a portion of said code page is encrypted.

19. At least one non-transitory computer-readable storage medium having instructions stored thereon which when executed by a processor result in the following operations for protecting confidential data, said operations comprising:
   establishing a code page in memory, said code page restricted to execute-only access;
   defining a transaction region associated with at least a portion of said code page; and
   executing a load instruction located in said code page, said load instruction to load at least a portion of said confidential data from an immediate operand of said load instruction if a transaction mode of said transaction region is enabled.

20. The computer-readable storage medium of claim 19, wherein said load instruction is to load said confidential data to a register associated with a processor.

21. The computer-readable storage medium of claim 19, wherein said load instruction is to generate a fault if said transaction mode of said transaction region is not enabled.

22. The computer-readable storage medium of claim 19, wherein said load instruction is to load a pre-determined constant, said constant unassociated with said confidential data, if said transaction mode of said transaction region is not enabled.

23. The computer-readable storage medium of claim 19, further comprising clearing said loaded confidential data in response to an abort of said transaction mode.

24. The computer-readable storage medium of claim 19, further comprising clearing said loaded confidential data on exit of said transaction mode.

25. The computer-readable storage medium of claim 19, further comprising encoding said portion of said confidential data in said immediate operand such that said encoded data represents at least a portion of a no-operation (NOP) instruction sequence.

26. The computer-readable storage medium of claim 19, further comprising:
   executing a pre-guard code segment before said load instruction, said pre-guard code segment to load a selected constant into a first location; and
   executing a post-guard code segment after said load instruction, said post-guard code segment to load said selected constant into a second location and to verify that the content of said first and said second locations match.

27. The computer-readable storage medium of claim 19, further comprising executing a check instruction to verify that execution is from said code page and aborting said transaction mode if said verification fails.

28. The computer-readable storage medium of claim 19, wherein said confidential data is an encryption key and said load instruction is dynamically generated based on information received over a secure network connection.

* * * * *